US006950663B2

United States Patent
Pihl et al.

(10) Patent No.: US 6,950,663 B2
(45) Date of Patent: Sep. 27, 2005

(54) METHOD OF LOCATING A MOBILE STATION BASED ON OBSERVED TIME DIFFERENCE

(75) Inventors: Kari Pihl, Kaarina (FI); Harri Jokinen, Hiisi (FI)

(73) Assignee: Nokia Mobile Phones Ltd., Espoo (FI)

( * ) Notice: Subject to any disclaimer, the term of this patent is extended or adjusted under 35 U.S.C. 154(b) by 583 days.

(21) Appl. No.: 09/939,058

(22) Filed: Aug. 24, 2001

(65) Prior Publication Data

US 2003/0040323 A1 Feb. 27, 2003

(51) Int. Cl.[7] .................................................. H04Q 7/20
(52) U.S. Cl. ........................ 455/456.5; 455/456.1; 455/456.6; 455/450; 342/450; 342/457
(58) Field of Search ................. 455/456.5, 456.1, 455/456.6, 456.2, 450; 342/450, 457, 451, 457.11

(56) References Cited

U.S. PATENT DOCUMENTS

| | | | |
|---|---|---|---|
| 5,960,355 A | 9/1999 | Ekman et al. | 455/456 |
| 6,236,359 B1 * | 5/2001 | Watters et al. | 342/357.1 |
| 6,236,365 B1 * | 5/2001 | LeBlanc et al. | 342/457 |
| 6,246,361 B1 * | 6/2001 | Weill et al. | 342/357.01 |
| 6,519,464 B1 * | 2/2003 | Santhoff et al. | 455/456.5 |
| 6,597,916 B2 * | 7/2003 | Edge | 455/445 |
| 6,677,895 B1 * | 1/2004 | Holt | 342/357.1 |
| 6,785,321 B1 * | 8/2004 | Yang et al. | 375/137 |

FOREIGN PATENT DOCUMENTS

| | | |
|---|---|---|
| WO | WO 99/21028 | 4/1999 |
| WO | WO 00/64208 | 10/2000 |
| WO | WO 01/52569 | 7/2001 |

OTHER PUBLICATIONS

ETSI TS 101 724 v8.0.0 (Oct. 2000) Digital cellular telecommunications system (Phase 2+); Location Services (LCS); (Functional description)—Stage 2 (GSM 03.71 version 8.0.0 Release 1999).

ETSI TS 101 529 v8.1.0 (May 2000) Digital cellular telecommunications system (Phase 2+); Location Services (LCS); Serving Mobile Location Centre—Serving Mobile Location Centre (SMLC—SMLC); SMLCPP specification (3Gpp TS 08.31 version 8.1.0 Release 1999).

\* cited by examiner

*Primary Examiner*—William Trost
*Assistant Examiner*—Danh C Le
(74) *Attorney, Agent, or Firm*—Ware, Fressola, Van Der Sluys & Adolphson LLP

(57) ABSTRACT

An E-OTD method for locating a mobile station using measurement information related to arrival of signals transmitted from base stations of different operators for obtaining the base station locations. When one operator does not have enough base stations for providing measurement information for location calculation, the SMLC of that operator acquires measurement information of base stations from at least one other operator using SMLC-SLMC communication protocol.

16 Claims, 6 Drawing Sheets

METHOD OF LOCATING A MOBILE STATION BASED ON OBSERVED TIME DIFFERENCE

FIELD OF THE INVENTION

The present invention relates generally to mobile station positioning and, more particularly, to location calculation performed by the mobile station or the network based on enhanced observed time difference.

BACKGROUND OF THE INVENTION

LoCation Services (LCS) is specified for Release 98 and later versions of GSM standards (see "Digital Cellular Telecommunications system (Phase 2+); Location Services (LCS); Functional description, ETSI TS 101 724 v8.0.0 (2000-10); and SMLC-SMLC SMLCPP Specification, ESTI TS 101 529 v8.0.0 (2000-05)). The standard supports several location estimation technologies including E-OTD. The Enhanced Observed Time Difference (E-OTD) positioning method employed in Global System for Mobile Communication (GSM) is developed from the Observed Time Difference (OTD) feature. The E-OTD method is based on the relative time of arrival of the signals from a number of base stations (BTSs) on BCCH (Broadcast Common Channel) frequency as measured by the target mobile station (MS)—the position of which is estimated. The position of the mobile station is determined by deducing the geometrical components of the time delays to the mobile station from the base stations. As GSM network is asynchronous, the signals are also received by at least one fixed measuring point known as the Location Measurement Unit (LMU) whose location is known. The LMU measurements are used to calibrate out the asynchronous nature of the BTS transmission. The E-OTD measurements carried out by the mobile station and calibrated with the LMU measurements result in the time measurements known as Real Time Difference (RTD). RTD measurements of at least three geographically distinct base stations are needed in the E-OTD method.

The location estimate is performed by a Position Calculation Function (PCF) located in the target MS or in the network. With the same network architecture, MS functions, LMU functions and measurement inputs, the PCF can be based on one of two possible types of E-OTD location calculations, known as "hyperbolic' and 'circular'. Both types of E-OTD location calculations are based on the principle of triangulation. The hyperbolic-type E-OTD location calculation is illustrated in FIG. 1a, and the circular-type E-OTD location calculation is illustrated in FIG. 1b. The triangulation used in the hyperbolic type is based on the Geometric Time Difference (GTD), or the time difference between the reception by the mobile station of bursts from two different base stations due to geometry. If the length of the propagation path between BTS1 and the mobile station is d1 and the length of the propagation path between BTS2 and the mobile station is d2, the $GTD=(d2-d1)/v$, where v is the speed of the radio waves. GTD is the difference between OTD and RTD. The possible location for the MS observing a constant GTD value (d2−d1=constant) between two base stations is a hyperbola. Thus, the MS can be located in the interclause of two hyperbolas obtained from three base stations and two GTD values.

Unlike the hyperbolic type, which uses the time differences at the MS and LMU between the receipt of signals from at least two pairs of base stations, the circular-type E-OTD location calculation uses arrival time of those signals individually. From the arrival time, as measured by the MS and the LMU, the length of the propagation path between the mobile station and each of the three base stations BTS1–BTS3 can be deduced. The position of the MS is defined by the interclause of circles centered on the base stations common to observations made by the MS and the LMU.

It is known that in GSM, base stations are linked with one or more base station controllers (BSCs), which monitor and control the linked base stations. As shown in FIG. 2, the BSCs are linked to a Serving Mobile Location Center (SMLC), which contains functionality required to support LCS. More specifically, the SMLC manages the overall coordination and scheduling of resources required to perform positioning of a mobile station (target MS). The SMLC can be network subsystem (NSS) based or base station subsystem (BSS) based. A BSS-based SMLC supports positioning by signaling to the BSC serving the target MS. The SMLC controls a number of LMUs for the purpose of obtaining radio interface measurements to locate or help locating MS subscribers in the area in which the SMLC serves. An LMU can be co-located with a base station or located at a fixed point different from any base station.

When positioning of an MS is requested, the MS obtains assistance data for E-OTD measurements from the SMLC, delivered via RRLP (LCS protocol) running over the RR (radio resource management) layer. The E-OTD assistance data contains a list of the neighboring base stations to be measured, including the identity and time information related to those base stations, so that the MS knows what to measure. Based on the measurement data, the MS can calculate its own position if the location information of the relevant base stations are also provided to the MS in the RRLP E-OTD assistance data message. Alternatively, the data measured by the MS is reported to the SMLC for location calculation.

UTRAN (Terrestrial Radio Access Network for Universal Mobile Telecommunication Services) supports a very similar location service as E-OTD in GSM. The same enhancement as described here for GSM, can be used equally well for improving Idle Period Downlink Observed Time Difference of Arrival (IPDL OTDOA) measurements in UTRAN.

When the MS is located in an area where the service of one Public Land Mobile Network (PLMN) ends and the service of another PLMN starts, it is possible that neither network operator has enough base stations for sufficient triangulation. This problem typically occurs at border areas. A similar problem may occur in an area that is covered by more than one PLMN but the MS cannot measure enough base stations of the serving PLMN for sufficient triangulation. In other words, no single network operator may have a desirable BTS (base stations) topology for carrying out accurate MS location estimation. Thus, the Quality of Service (QoS) may not be sufficient, for example, for emergency call services (E911/E112) for at least one operator in that area.

Thus, it is advantageous and desirable to provide a method for MS positioning where the conventional E-OTD MS positioning method is inadequate.

SUMMARY OF THE INVENTION

The present invention provides a method of locating a mobile station in a telecommunications network having at least two network operators each having a serving mobile location center linking to a plurality of base stations. When neither network has sufficient BTS topology for providing a sufficiently accurate location of the mobile station, the measurement information of the base stations can be shared between the network operators for location calculation. The method, according to the present invention, makes use of the fact that the serving mobile location centers of same or different public land mobile networks are capable of sharing information with each other using a standardized SMLC-SMLC communication protocol. With this capability, the serving mobile location center responsible for serving the mobile station with the E-OTD assistance data includes the BTS and BCCH information, and related parameters such as base station identity codes (BSICs) from both network operators in the RRLP E-OTD assistance data message and delivers the information to the target mobile station. Moreover, the measurement assistance for LMUs of one network operator is extended with additional BCCH information (for transmission-time synchronization calibration) from another network operator. With the additional BTS and BCCH information, the target mobile station measures the BCCH frequencies from different network operators, and reports the measurements to the responsible serving mobile location center for location calculation. Alternatively, the location estimate is calculated in the target mobile station if the BTS location information is also provided to the mobile station in the RRLP E-OTD assistance data message. It should be noted that it is possible for the LMU to automatically track the BCCH frequency and probably BSIC of a BTS of a foreign PLMN in order to minimize the need to exchange data between operators. Furthermore, the present invention can be extended to the idle period downlink observed time difference of arrival (IPDL OTDOA) measurements in UTRAN, wherein assistance data message is provided over a radio resource control (RRC) layer. In UTRA, SMLC-SMLC communications are supported by the Iur protocol.

Accordingly, the present invention provides a method of locating a mobile station in a telecommunications network having at least a first network operator having a plurality of first base stations and a second network operator having a plurality of second base stations, said method using measurement information related to arrival of signals transmitted from the first and second base stations to the mobile station for obtaining the location thereof based on observed time difference, said method comprising the steps of:

acquiring the measurement information of at least one second base station and the measurement information of one or more first base stations, when the measurement information of the first base stations alone is insufficient for location calculation; and calculating the location of the mobile station based on the acquired measurement information.

Preferably, the measurement information includes time-reference information for obtaining real-time difference (RTD) regarding the arrival of the transmitted signals, and the time-reference information is provided by at least one location measurement unit (LMU).

It is possible that the measurement information includes the geometric time-difference (GTD) between the arrival time of signals transmitted from two of the first or second base stations.

Preferably, the arrival of the transmitted signal is measured based on a broadcast common control channel (BCCH) frequency.

Preferably, the location calculation is based on triangulation, using the circular-type or the hyperbolic-type method.

According to the present invention, the first network operator has at least one first serving mobile location center (SMLC) for providing observed time difference assistance data of the first base stations, and the second operator has at least one second serving mobile location center for providing observed time difference assistance data of the second base stations to the first serving mobile location center, allowing the first serving mobile location center to convey the observed time difference assistance data of the first and second base stations for the mobile station to acquire the measurement information based thereon, wherein the assistance data includes identity and the BCCH frequency of the first and second base stations.

It is possible that the BCCH frequency is automatically tracked by said at least one LMU.

According to the present invention, the telecommunications network can be a GSM network and, the observed time difference is E-OTD, and wherein the observed time difference assistance data is conveyed to the mobile station via a location services protocol (RRLP) over the radio resource management (RR) layer.

According to the present invention, the telecommunications network can also be a UTRAN network and the observed time difference is IPDL OTDOA, and wherein the observed time difference assistance data is conveyed to the mobile station over the radio resource control (RRC) layer.

It is possible that the calculating step is carried out in the first serving mobile center.

It is also possible that the observed time difference assistance data further includes location information of the first and second base stations and the calculating step is carried out in the mobile station based on the location information.

The present invention will become apparent upon reading the description taken in conjunction with FIG. 3a to FIG. 5.

BRIEF DESCRIPTION OF THE INVENTION

DETAILED DESCRIPTION OF THE INVENTION

Figure 1A:
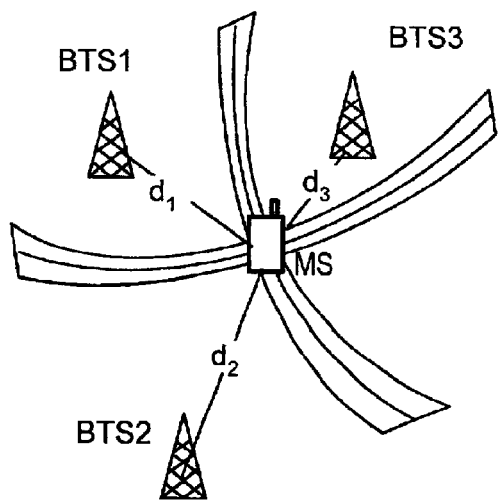
FIG. 1a is a diagrammatic representation illustrating the prior art triangulation method based on hyperbolic-type E-OTD.
Figure 1B:
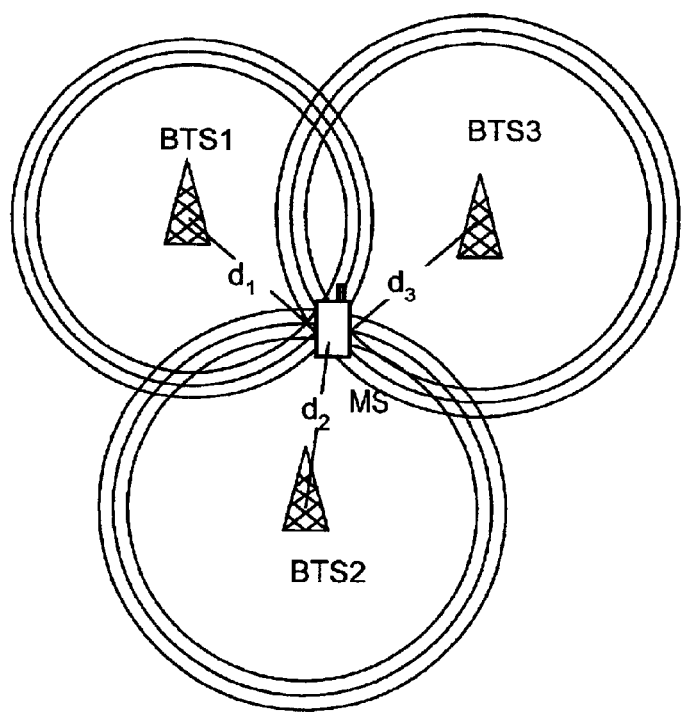
FIG. 1b is a diagrammatic representation illustrating the prior art triangulation method based on circular-type E-OTD.
Figure 2:
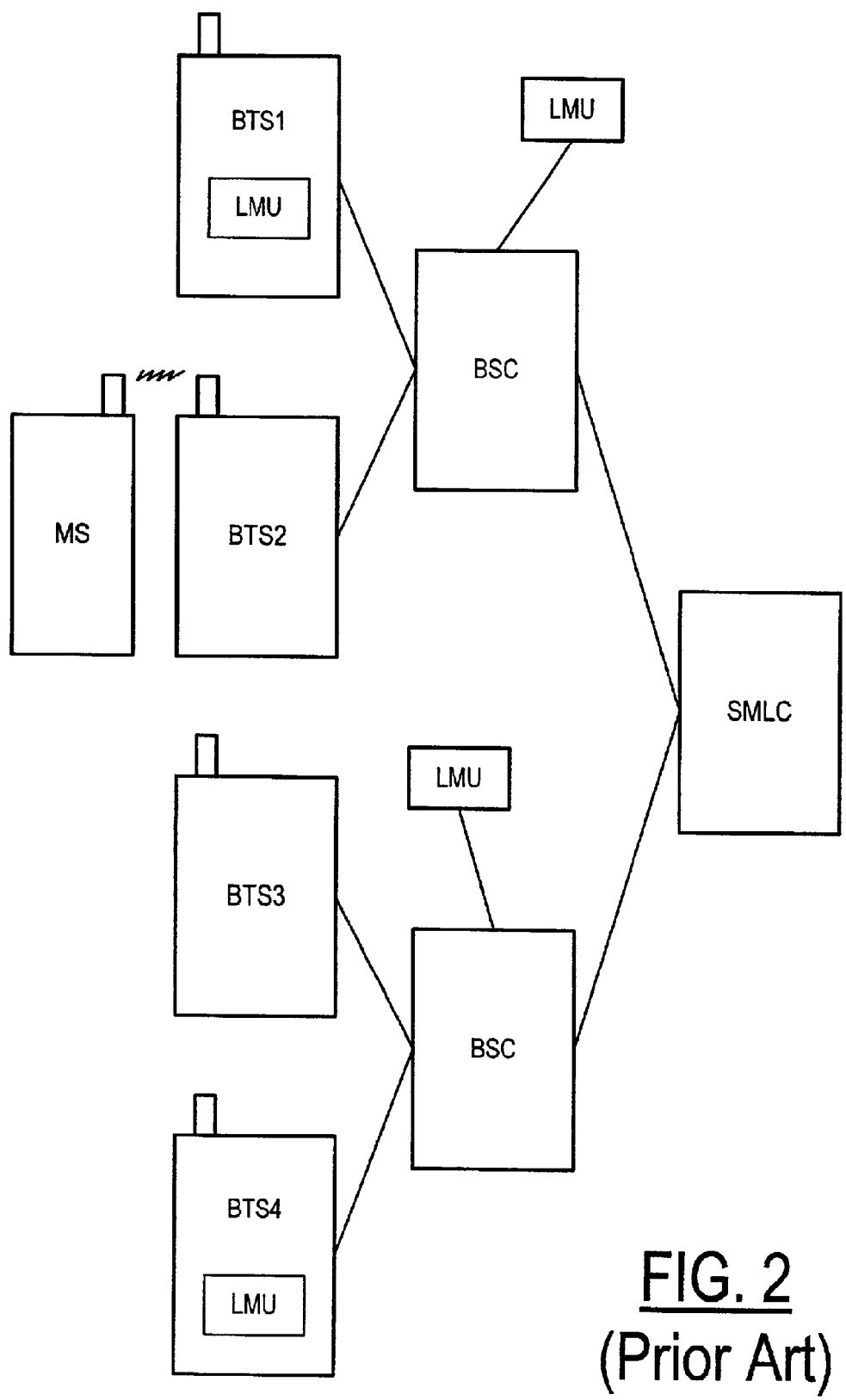
FIG. 2 is a diagrammatic representation illustrating the prior art MS positioning method.
Figure 3A:
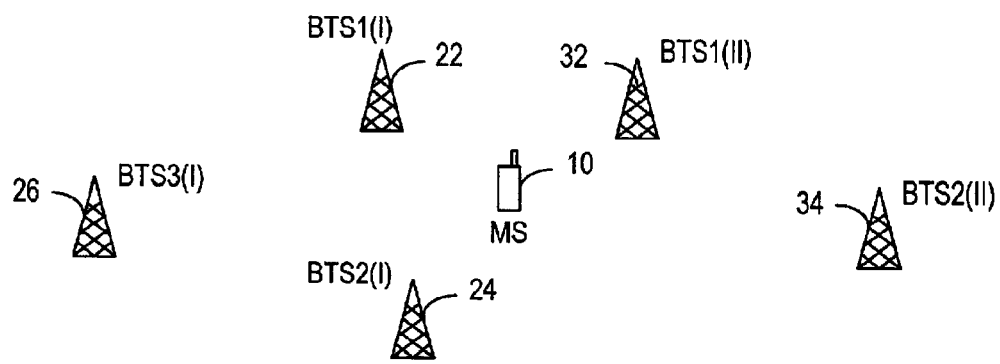
FIG. 3a is a diagrammatic representation illustrating a situation wherein the triangulation method, according to the present invention, is used.
Figure 4:
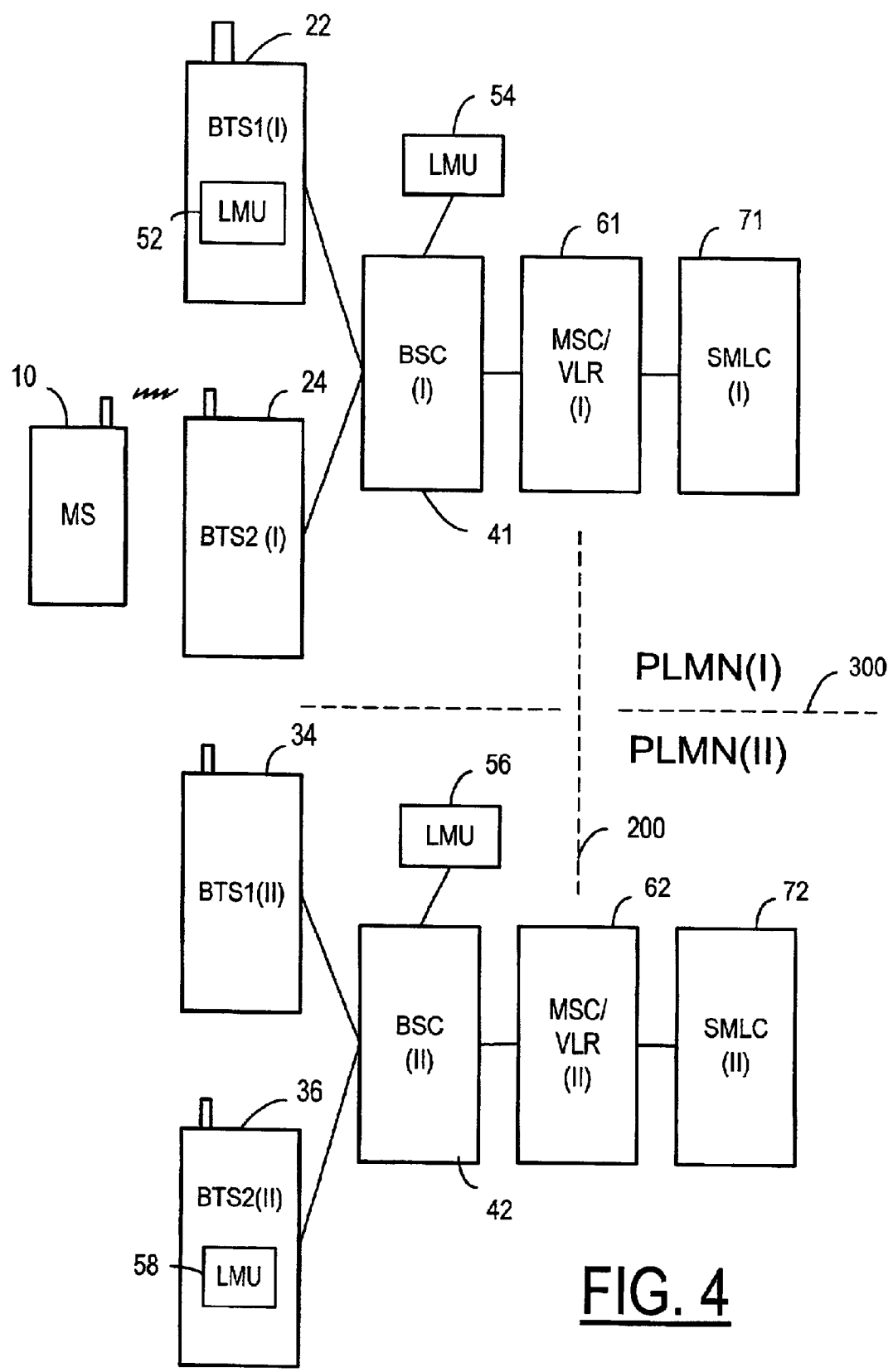
FIG. 4 is a diagrammatic representation illustrating a telecommunications network having the components for providing measurement information to the mobile station for location calculation.

FIG. 3a illustrates a border area where the service area of the Public Land Mobile Network (PLMN (I), FIG. 4)

responsible for serving the mobile station 10 ends and the service area of another Public Land Mobile Station (PLMN (II), FIG. 4) starts. The base stations 22–26 in the border area are linked to a serving mobile location center (SMLC) through an MSC/VLR (Mobile-Services Switching Center/Visitor Location Register) of PLMN(I) (see FIG. 4), and base stations 32–36 are linked to a SMLC through an MSC/VLR of PLMN(II) (see FIG. 4). When the mobile station 10 is located in a border such as this, the mobile station 10 has difficulty handling the necessary measurement. However, a standardized SMLC-SMLC communication protocol renders the sharing of information between the SMLC 71 and the SMLC 72 possible, even though the SMLC 71 and the SMLC 72 belong to different network operators (not shown). Here, base stations 22–26 belong to one network operator and base stations 32–36 belong to another network operator. Because the E-OTD location calculation is based on triangulation, the measurement information of at least three base stations is needed for location calculation. Furthermore, the location of the mobile station 10 is useful only when it is sufficiently accurate. When the measurement information from at least three base stations is useful for obtaining accurate MS location, the BTS topology is said to be optimized for triangulation. As shown in FIG. 3, only the measurement information of base stations 22, 24 from one operator is useful for location calculation, and the BTS topology regarding that operator is not optimized. Thus, it is necessary to rely on the measurement information of at least one base station from another network operator. For example, the measurement information of base station 32 can be used, along with that of base stations 22 and 24, for location calculation.

Sharing BTS information between operators for E-OTD location purposes would enhance the location estimates for all mobile stations attached to the telecommunications network. In reality, it means that the operators only need to share the location information and the BCCH frequency and relates parameters such as the base station identity code (BSIC) of the relevant base stations. As shown in FIG. 3, the relevant base stations are the base stations 22, 24 and 32. Accordingly, the SMLC responsible for providing the mobile station 10 with E-OTD assistance data communicates with the other SMLC using the standardized SMLC-SMLC communication protocol to obtain location information BCCH frequency and related parameters of the base station 32. The obtained information is included in the RRLP (RR LCS Protocol) E-OTD assistance data message and delivered to the target mobile station 10 over the RR (Radio Resource Management) layer. Also, the measurement assistance for LMUs (see FIG. 4) is extended with the additional BCCH information from the other operator. Accordingly, the mobile station 10 can measure the BCCH frequencies from more than one operator and report the measurements to the responsible SMLC for location calculation. Alternatively, the mobile station 10 can calculate the location estimate and send the estimate to the SMLC, provided that the location information of base stations 22, 24 and 32 are also included in the RRLP E-OTD assistance data message and delivered to the mobile station 10.

Figure 3B:
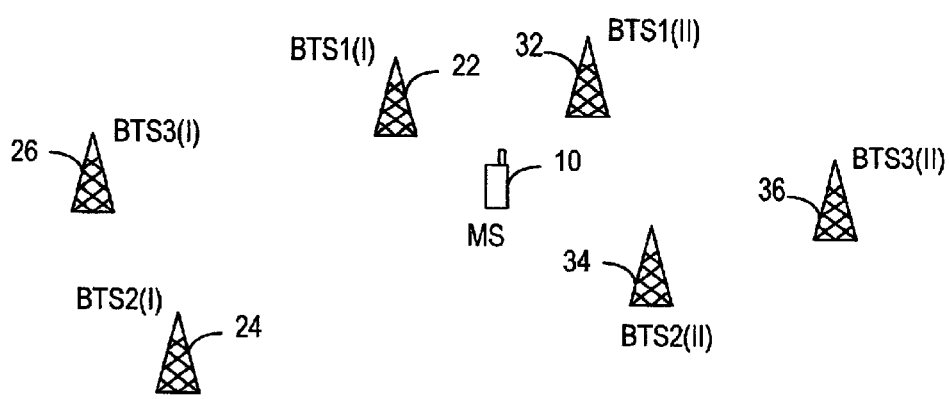
FIG. 3b is a diagrammatic representation illustrating another situation wherein the triangulation method, according to the present invention, is used.

Similarly, when the mobile station 10 is located in an area where only the measurement information of base station 22 linking to the responsible SMLC is useful for location calculation, as shown in FIG. 3b, it needs the measurement information of at least two base stations linking to the other SMLC for location calculation. Accordingly, the responsible SMLC acquires measurement information of base stations 32 and 34 from the other SMLC and conveys this information to the mobile station 10.

Figure 3C:
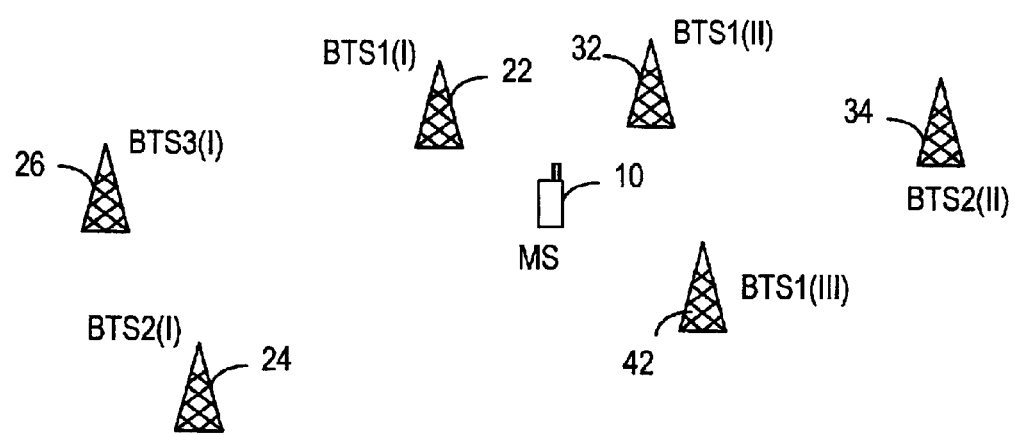
FIG. 3c is a diagrammatic representation illustrating yet another situation wherein the triangulation method, according to the present invention, is used.

The sharing of BTS location information can be carried out between two operators, as described in conjunction with FIG. 3a and 3b. If necessary, the sharing can be carried out among three operators. As shown in FIG. 3c, the measurement information of base stations 22, 32 and 42 are used for location calculation. In that case, the SMLC responsible for serving the mobile station 10 with RRLP E-OTD assistance data message to the mobile station 10 must communicate with two other SMLCs for BTS location information. Furthermore, the LMUs should be extended with the additional BCCH information from the other two operators.

FIG. 4 shows the various components of a telecommunications network involved in locating mobile stations using the E-OTD method, according to the present invention. The target mobile station is denoted by reference numeral 10 and the base station currently serving the mobile station 10 is denoted by reference numeral 22. The mobile station 10 is located in a border area served by PLMN(I) and PLMN(II). The dashed line 300 symbolically shows where one PLMN ends and the other PLMN starts. The base station 22, along with the base stations 24, 26, is linked to a serving mobile location center (SMLC) 71 via a base station controller (BSC) 41 and an MSC/VLR 61 of PLMN(I). Also shown in FIG. 4 are a plurality of base stations 32, 34, 36 of another network operator, which are linked to another SMLC 72 via another BSC 42 and another MSC/VLR 62 of PLMN(II). A number of location measurement units (LMUs) 52–58 can be used for providing time-reference information for transmission-time synchronization calibration. As shown, only the base stations 22 and 24 can provide useful measurement information for E-OTD location calculation regarding the mobile station 10. Thus, the measurement information of base station 32 is also used. When an LCS client requests that the mobile station 10 be located, the SMLC 71 communicates with the SMLC 72 for obtaining location information of the base station 32 via signal 200, using the standard SMLC-SMLC communication protocol. The SMLC 71 includes the location information of the base stations 22, 24 and 32 to the mobile station 10 in the E-OTD assistance data and delivers the information to the mobile station 10. It should be noted that the service area of PLMN(I) and the service area of PLMN(II) may overlap and the mobile station 10 is located in an area that is covered by two or more PLMNs. However, the mobile station 10 cannot measure enough base stations of PLMN(I) for sufficient triangulation.

Figure 5:
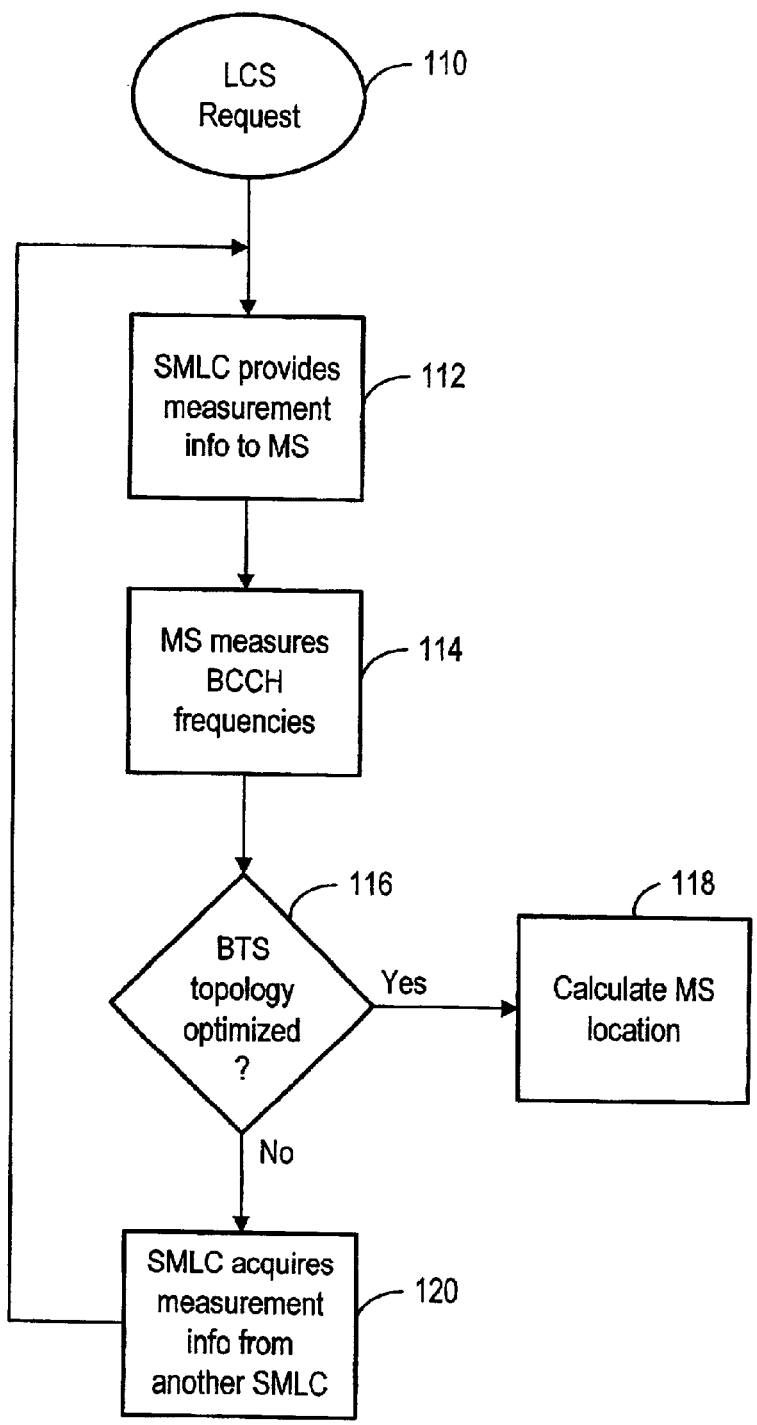
FIG. 5 is a flowchart illustrating the method of locating a mobile station, according to the present invention.

FIG. 5 is a flowchart illustrating the E-OTD location calculation method, according to the present invention. As shown, upon receiving an MS location calculation request from an LCS client at step 110, the SMLC provides the target mobile station with an E-OTD assistance data message regarding base stations linking to the SMLC, at step 112. The mobile station measures BCCH frequencies of the base stations identified by the SMLC at step 114. At step 116, it is determined whether the measurement data of the base stations is sufficient for triangulation. If so, the measurement data is used for location calculation at step 118. Otherwise, the SMLC communicates with another SMLC to acquire location information of other base stations linking to the other SMLC, at step 120. The E-OTD assistance data message is delivered to the target mobile station again at step 112, allowing the target mobile station to make measurements on all relevant base stations at step 114.

The present invention can be implemented by arranging the information share between operators. This information share may need to be arranged in real-time because changes on the BCCH frequencies need to be up-to-the-moment.

Preferably, the interface for sharing is standardized such that the SMLC-SMLC communication standard is extended to include the needed parameters for information sharing purposes between operators. It is possible that information handling through the operations and maintenance (O&M) module be carried out manually, because the BCCH configuration need not be changed frequently, especially when BTS density is low. The LMUs of the serving operator may automatically remove any BTS data that is no longer valid. The LMUs may even be able to detect a change in the BCCH frequency automatically by decoding the BTS Cell Identity. The present invention solves the problem where at least one of the operators in some area does not have enough BTSs for sufficient triangulation in order to obtain MS location using the E-OTD method with desired accuracy. By sharing BTS location information and BCCH frequency among different operators, the LCS service can be enhanced for emergency call purposes, for example, without building expensive BTS networks simply to obtain better BTS topology for E-OTD systems.

The telecommunications network as illustrated in FIG. 4 has been described in conjunction with a GSM network, wherein the method of locating a mobile station is based on E-OTD, and the involved SMLC conveys RRLP E-OTD assistance data message to the target mobile station over the RR layer. However, the same illustrated network can also be viewed as a UTRAN network, wherein the method of locating a mobile station is based on IPDL OTDOA, and the observed time difference assistance data message is conveyed over the RRC layer. While the communication between two SMLCs in a GSM network goes over an Lp interface, the communication between two SMLCs in a UTRAN goes over an Iur interface. The Iur protocol supports SMLC-SMLC communications in UTRAN.

Although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of locating a mobile station in a telecommunications network having at least a first network operator having a plurality of first base stations and a second network operator having a plurality of second base stations, said method using measurement information related to arrival of signals transmitted from the first and second base stations to the mobile station for obtaining the location thereof based on observed time difference, said method comprising the steps of:

acquiring (120) the measurement information of at least one second base station and the measurement information of one or more first base stations when the measurement information of the first base stations alone is insufficient for location calculation; and calculating (118) the location of the mobile station based on the acquired measurement information.

2. The method of claim 1, wherein the measurement information includes time-reference information for obtaining real-time difference (RTD) in the arrival of the transmitted signals, and the time-reference information is provided by at least one location measurement unit (LMU).

3. The method of claim 1, wherein the measurement information includes geometric time-difference (GTD) between the arrival time of signals transmitted from two of the first or second base stations.

4. The method of claim 1, wherein the arrival of the transmitted signal is measured based on a broadcast common control channel (BCCH) frequency.

5. The method of claim 1, wherein the arrival of transmitted signal is measured based on a broadcast common control channel (BCCH) frequency, which is automatically tracked by the LMU.

6. The method of claim 1, wherein the location calculation is based on triangulation.

7. The method of claim 1, wherein the location calculation is based on a circular-type method.

8. The method of claim 1, wherein the location calculation is based on a hyperbolic-type method.

9. The method of claim 1, wherein the first network operator has at least one first serving mobile location center (SMLC) for providing assistance data of the first base stations, and the second operator has at least one second serving mobile location center for providing assistance data of the second base stations to the first serving mobile location center, allowing the first serving mobile location center to provide the assistance data of the first and second base stations to the mobile station, for the mobile station to acquire the measurement information based on the provided data.

10. The method of claim 9, wherein the assistance data includes the identity and BCCH frequency of the first and second base stations.

11. The method of claim 9, wherein the telecommunications network is a GSM network, and the assistance data is provided to the mobile station via a location services protocol (RRLP) over a radio resource management (RR) layer.

12. The method of claim 9, wherein the telecommunications network is a UTRAN network, and the assistance data is provided to the mobile station over a radio resource control (RRC) layer.

13. The method of claim 9, wherein the calculating step is carried out in the first serving mobile center.

14. The method of claim 9, wherein the assistance data further includes location information of the first and second base stations and the calculating step is carried out in the mobile station based on the location information.

15. The method of claim 1, wherein the telecommunications network is a GSM network and the observed time difference is E-OTD.

16. The method of claim 1, wherein the telecommunications network is a UTRAN network and the observed time difference is IPDL OTDOA.

* * * * *